United States Patent [19]

Deubzer et al.

[11] 4,356,293

[45] Oct. 26, 1982

[54] ORGANOSILOXANE BLOCK COPOLYMERS

[75] Inventors: Bernward Deubzer, Burghausen; Norbert Egerter, Emmerting; Volker Frey, Burghausen, all of Fed. Rep. of Germany; Kurt Leitner, Ach, Austria

[73] Assignee: Wacker-Chemie GmbH, Munich, Fed. Rep. of Germany

[21] Appl. No.: 210,920

[22] Filed: Nov. 28, 1980

[30] Foreign Application Priority Data

Jan. 29, 1980 [DE] Fed. Rep. of Germany ....... 3003116

[51] Int. Cl.$^3$ ...................... C08G 77/44; C08G 77/08
[52] U.S. Cl. ...................................... 525/477; 528/14
[58] Field of Search ........................... 525/477; 528/14

[56] References Cited

U.S. PATENT DOCUMENTS 2,588,366  3/1952  Dennett ............................... 525/477
3,308,203  3/1967  Metevia et al. ...................... 525/477
3,504,051  3/1970  McVannel ........................... 525/477

Primary Examiner—Wilbert J. Briggs, Sr.

[57] ABSTRACT

A process for preparing organosiloxane block copolymers which comprises reacting (a) an organopolysiloxane containing Si-bonded hydroxyl groups and having an average molecular weight of at least 800 g/mole, in which at least 80 mole percent of the units are siloxane units, and one valence of each silicon atom is satisfied by an SiC-bonded organic radical, while the remaining silicon valences are satisfied by siloxane oxygen atoms or hydroxyl groups, with (b) a diorganopolysiloxane having one Si-bonded hydroxyl group in each terminal unit and an average of at least 10 silicon atoms per molecule in the presence of (c) an organic solvent and (d) an alkali metal carbonate and/or an alkali metal carboxylate to form an organosiloxane block copolymer.

5 Claims, No Drawings

ORGANOSILOXANE BLOCK COPOLYMERS

The present invention relates to organopolysiloxanes particularly to organopolysiloxane block copolymers and more particularly to a process for preparing organopolysiloxane block copolymers.

BACKGROUND OF THE INVENTION

Organopolysiloxane block copolymers and processes for preparing the same are known in the art. For example, U.S. Pat. No. 3,436,439 to Woods describes a process for preparing organosiloxane block copolymers which comprises reacting organopolysiloxanes having at least 80 mole percent siloxane units and containing Si-bonded hydroxyl groups in which one valence of each silicon atom is satisfied by an SiC-bonded organic radical, and the remaining silicon valences are satisfied by siloxane oxygen atoms or hydroxyl groups, and have an average molecular weight of at least 800 g/mole, with diorganopolysiloxanes having one Si-bonded hydroxyl group in each terminal unit and an average of at least 10 silicon atoms per molecule in an organic solvent. In contrast to the known processes for preparing organosiloxane block copolymers, and especially the process described in the above reference, the process of the present invention provides certain advantages. For example, the reaction time is substantially reduced, the process is more efficient, i.e., fewer steps are required and more uniform linear and branched organopolysiloxane block copolymers are formed. In addition, the process of this invention provides products after evaporation of the solvent, which are non-adhesive even in the absence of a crosslinking agent.

Therefore, it is an object of this invention to provide a process for preparing organopolysiloxane block copolymers. Another object of this invention is to provide a more efficient process for preparing organopolysiloxane block copolymers. Still another object of this invention is to provide a process for preparing organopolysiloxane block copolymers which may be duplicated from batch-to-batch. A further object of this invention is to provide a process for preparing more uniform linear and branched organopolysiloxane block copolymers. A still further object of this invention is to provide a process for preparing organopolysiloxane block copolymers which are nonadhesive in the absence of a crosslinking agent.

SUMMARY OF THE INVENTION

The foregoing objects and others which will become apparent from the following description are accomplished in accordance with this invention, generally speaking, by providing a process for preparing organopolysiloxane block copolymers which comprises reacting (a) organopolysiloxanes containing Si-bonded hydroxyl groups and having an average molecular weight of at least 800 g/mole, in which at least 80 mole-percent of the units are siloxane units and one valence of each silicon atom is satisfied by an SiC-bonded organic radical, while the remaining silicon valences are satisfied by siloxane oxygen atoms or hydroxyl groups, with (b) diorganopolysiloxanes having one Si-bonded hydroxyl group in each terminal unit and an average of at least 10 silicon atoms per molecule, in the presence of (c) an organic solvent and (d) an alkali metal compound selected from an alkali metal carbonate, an alkali metal carboxylate and mixtures thereof.

DETAILED DESCRIPTION OF THE INVENTION

The organopolysiloxanes (a) containing Si-bonded hydroxyl groups and having an average molecular weight of at least of 800 g/mole, in which one valence of each silicon atom is satisfied by an SiC-bonded organic radical, and the remaining silicon valences are satisfied by siloxane oxygen atoms or hydroxyl groups, contain at least 80 mole-percent of siloxane units of the general formula $$RSiO_{3/2},$$

where R represents the SiC-bonded organic radical. Other siloxane units which may be present are preferably $R_2SiO$, $R_3SiO_{1/2}$, or $SiO_{4/2}$ units, where R is the same as above.

Although it is essential that the hydroxyl containing organopolysiloxane contain at least 80 mole-percent of $R\,SiO_{3/2}$ units, it is preferred that the organopolysiloxane contain at least 90 mole-percent of $R\,SiO_{3/2}$ units.

The SiC-bonded organic radicals in the hydroxyl containing organopolysiloxane (a) which consists of at least 80 mole-percent and more preferably at least 90 mole-percent of siloxane units, in which one valence of each silicon atom is satisfied by an SiC-bonded organic radical while the remaining silicon valences are satisfied by siloxane oxygen or hydroxyl groups, as well as the R radicals in the above formula. The radicals represented by R are preferably alkyl radicals having from 1 to 4 carbon atoms, such as methyl, ethyl, or n-butyl radicals or aromatic radicals such as the phenyl radical, with the phenyl radical being the preferred radical.

The upper limit for the molecular weight of the organopolysiloxane (a) containing Si-bonded hydroxyl groups which contain at least 80 mole-percent of siloxane units in which one valence of each silicon atom is satisfied by an SiC-bonded organic radical, and the remaining silicon valences are satisfied by siloxane oxygen atoms or hydroxyl groups, is not critical as long as the organopolysiloxane (a) is soluble in the solvent at the particular reaction temperature.

The amount of Si-bonded hydroxyl groups present in the organopolysiloxane (a) containing Si-bonded hydroxyl groups is preferably 0.1 to 7 percent by weight.

Processes for preparing the organopolysiloxanes containing Si-bonded hydroxyl groups described above are well known in the art. They may be prepared by hydrolyzing phenyltrichlorosilane or methyltrichlorosilane, or by hydrolyzing a mixture of phenyltrichlorosilane and methyltrichlorosilane.

Diorganopolysiloxanes (b) having one Si-bonded hydroxyl group in each terminal unit and an average of at least 10 silicon atoms per molecule can be represented by the general formula $$HOSiR_2'O(SiR_2'O)_nSiR_2'OH,$$

where R' represents the same or different monovalent hydrocarbon radicals or substituted monovalent hydrocarbon radicals, and n represents a whole number equal to at least 8.

In addition to the diorganosiloxane units $(SiR_2'O)$, present in the siloxane chain, other siloxane units may also be present within and/or along the siloxane chain of the diorganopolysiloxane illustrated above. Examples of such other siloxane units are those having the formulas R'SiO$_{3/2}$, R$_3$'SiO$_{1/2}$, and SiO$_{4/2}$, where R' is the same as above. However, siloxane units other than the diorganosiloxane units are preferably present in an amount which does not exceed about 20 mole-percent, and more preferably does not exceed about 5 mole-percent.

Examples of hydrocarbon radicals represented by R' are alkyl radicals having from 1 to 18 carbon atoms, such as methyl, ethyl, propyl, butyl, hexyl and octadecyl radicals; alkenyl radicals having from 2 to 5 carbon atoms such as vinyl, allyl, ethylallyl and butadienyl radicals; aryl radicals such as the phenyl radical; alkaryl radicals having from 7 to 16 carbon atoms such as tolyl radicals; and aralkyl radicals having from 7 to 16 carbon atoms such as the beta-phenylethyl radical.

Examples of substituted monovalent hydrocarbon radicals represented by R' are particularly halogenated aliphatic hydrocarbon radicals such as the 3,3,3-trifluoropropyl radical.

The diorganopolysiloxanes (b) which may be used in accordance with this invention are dimethylpolysiloxanes, phenylmethylpolysiloxanes, diphenylpolysiloxanes, methylvinylpolysiloxanes, or mixtures of such diorganopolysiloxanes, with the proviso that these diorganopolysiloxanes have one Si-bonded hydroxyl group in each terminal unit and an average of at least 10 silicon atoms per molecule.

At least 80 percent of the number of R' radicals are preferably methyl radicals, because of their availability.

The upper limit for the number of silicon atoms present in the diorganopolysiloxane (b) used in this invention is not critical; however, one Si-bonded hydroxyl group must be present in each terminal unit and the diorganopolysiloxane must have an average of at least 10 silicon atoms per molecule.

The amount of diorganopolysiloxane (b) having one Si-bonded hydroxyl group in each terminal unit and an average of at least 10 silicon atoms per molecule is preferably from 10 to 90 percent by weight, based on the total weight of the organopolysiloxanes.

The greater the amount of diorganopolysiloxane (b) used, the more flexible and elastomeric the resultant reaction product. The greater the amount of organopolysiloxane (a) used, which consists of at least 80 mole-percent of siloxane units in which one valence of each silicon atom is satisfied by an Si-bonded organic radical, the harder the resultant reaction product.

Any organic solvent in which the organopolysiloxanes are soluble at the particular reaction temperature and which are inert towards the other components of the reaction mixture may be used as a solvent in the process of this invention. Aromatic solvents such as benzene, toluene or xylenes are preferred. Other examples of suitable solvents are petroleum ether, chlorobenzene, esters and tetrahydrofuran.

Organic solvents are preferably used in an amount of at least 30 percent by weight and more preferably at least 50 percent by weight, based on the weight of the reaction mixture.

Examples of suitable alkali metal carbonates are lithium carbonate, sodium carbonate, potassium carbonate, rubidium carbonate, and cesium carbonate. Examples of suitable alkali metal carboxylates are lithium acetate, sodium acetate, potassium acetate, rubidium acetate and cesium acetate. The preferred alkali metal carbonate is sodium carbonate.

The alkali metal compounds, i.e., the alkali metal carbonates or alkali metal carboxylates or mixtures of such alkali metal compounds, are preferably used in an amount of from 0.1 to 3 percent by weight, based on the total weight of the organopolysiloxanes.

In order to control the molecular weight of the organosiloxane block copolymer prepared in accordance with this invention, compounds such as those having the general formulas, R$_3$' Si (OSiR$_2$')$_m$OR", or (R$_3$Si)$_2$NH may be employed, where R' is the same as above, R" is hydrogen or an alkyl group having from 1 to 4 carbon atoms, and m is 0 or a whole number equal to at least 1.

The reaction is preferably conducted at the reflux temperature of the solvent and at ambient pressure. If desired, however, higher or lower temperatures and/or higher or lower pressures may be used.

The water formed during the reaction may be readily removed through a water separator connected to the reflux condenser, when the solvent is immiscible or only slightly miscible with water.

When the reaction is complete, a drop of the reaction mixture placed on a glass plate produces a non-adhesive, homogeneous film after evaporation of the solvent.

When the reaction is carried out at a temperature of from 100° C. to 140° C., it is generally complete in from 1 to 2 hours.

The organosiloxane block copolymers prepared in accordance with this invention can be used where heat resistance, low flammability, water resistance or comparatively high-energy radiation resistance, non-adhesive surfaces, and/or insulation of electrical conductors are desired. The organosiloxane block copolymers prepared in accordance with this invention can be used as coatings, for impregnating, or as bonding agents for organic or inorganic substrates or for treating finely divided materials such as wood, fabrics including glass fabrics, metals, e.g., aluminum, mica, asbestos, rock wool, magnesium oxide or silicon dioxide.

In the following examples all parts and percentages are by weight unless otherwise specified.

EXAMPLE 1

A mixture containing 100 parts of a phenylpolysiloxane which consists of 100 mole-percent of siloxane units in which one valence of each silicon atom is satisfied by the phenyl radical while the remaining silicon valences are satisfied by siloxane oxygen atoms or hydroxyl groups (C$_6$H$_5$SiO$_{3/2}$), in which the melting point is 53° C., with an average molecular weight of about 1700 g/mole, and 5.2 percent by weight of Si-bonded hydroxyl groups, 100 parts of a dimethylpolysiloxane having one Si-bonded hydroxyl group in each terminal unit with a viscosity of 80 mm$^2$.s$^{-1}$ at 25° C., and at least 10 silicon atoms per molecule, 0.66 parts of anhydrous sodium carbonate, and 300 parts of toluene is refluxed for 2 hours in a 1-liter 3-necked flask equipped with a stirrer and reflux condenser having connected thereto a water separator. The water is removed through the water separator. After 2 hours, a drop of the reaction mixture placed on a glass plate produces a non-adhesive, homogeneous film after the solvent has been evaporated. The reaction mixture is mixed with 37 parts of n-butanol after distilling off 137 parts of toluene, and 0.2 parts of trimethylchlorosilane is added to inactivate the sodium carbonate.

The 50 percent by weight solution of organosiloxane block copolymer thus obtained produces a firm, completely nonadhesive and elastomeric film immediately after evaporation of the solvent at room temperature.

These film properties are present even after heating at 250° C. in air for 200 hours.

EXAMPLE 2

The procedure described in Example 1 is repeated, except that 120 parts of a phenylpolysiloxane are substituted for the 100 parts of phenylpolysiloxane, and 80 parts of dimethylpolysiloxane are substituted for the 100 parts of the dimethylpolysiloxane.

EXAMPLE 3

The procedure described in Example 1 is repeated, except that 80 parts of phenylpolysiloxane are substituted for the 100 parts of phenylpolysiloxane, and 120 parts of dimethylpolysiloxane are substituted for the 100 parts of dimethylpolysiloxane.

EXAMPLE 4

The procedure described in Example 1 is repeated, except that 66 parts of phenylpolysiloxane is substituted for the 100 parts of phenylpolysiloxane, and 134 parts of dimethylpolysiloxane are substituted for 100 parts of dimethylpolysiloxane.

Light opalescent solutions are obtained from Examples 2, 3 and 4 which produce non-adhesive films of high mechanical strength after evaporation of the solvent. These films can be made insoluble and infusible by heating at 180° C. for 10 to 20 minutes.

What is claimed is:

1. A process for preparing organosiloxane block copolymers which comprises reacting (a) organopolysiloxanes containing Si-bonded hydroxyl groups and having an average molecular weight of at least 800 g/mole in which at least 80 mole-percent of the siloxane units of the organopolysiloxanes are represented by the formula $RSiO_{3/2}$, where R is an SiC-bonded organic radical and the remaining silicon valences are satisfied by siloxane oxygen atoms or hydroxyl groups with (b) diorganopolysiloxanes having one Si-bonded hydroxyl group in each terminal unit and an average of at least 10 silicon atoms per molecule in which siloxane units other than diorganosiloxane units are present in an amount which does not exceed about 20 mole percent, in the presence of (c) an organic solvent for the organopolysiloxanes and (d) an alkali metal carbonate.

2. The process of claim 1, wherein the reaction is conducted in the presence of sodium carbonate.

3. The process of claim 1, wherein the diorganopolysiloxane (b) is represented by the formula

$$HOSiR_2'O(SiR_2'O)_nSiR_2'OH$$

where R' is selected from the group consisting of monovalent hydrocarbon radicals and substituted monovalent hydrocarbon radicals and n is equal to at least 8.

4. The process of claim 1, wherein the diorganopolysiloxane (b) is present in an amount of from 10 to 90 percent by weight based on the weight of the organopolysiloxanes (a) and (b).

5. The process of claim 1, wherein the alkali metal carbonate is present in an amount of from 0.1 to 3 percent by weight based on the weight of the organopolysiloxanes (a) and (b).